Sept. 7, 1948.  P. MUNAO ET AL  2,448,906
ARTIFICIAL FLAME
Filed May 15, 1946

INVENTORS
Philip Munao
Carmelo C. Munao
BY
ATTORNEY

Patented Sept. 7, 1948

2,448,906

UNITED STATES PATENT OFFICE 2,448,906

ARTIFICIAL FLAME

Philip Munao and Carmelo C. Munao,
Brooklyn, N. Y.

Application May 15, 1946, Serial No. 670,005

1 Claim. (Cl. 272—8)

This invention relates to new and useful improvements in the construction of imitation flames, and to a method for producing the same.

While not limited thereto, the invention is particularly concerned with the construction of artificial flames and logs or imitation logs such as are customarily used in imitation fireplaces. The invention proposes numerous modified forms for imitation flames including logs and the like.

In general, however, it is concerned with an imitation flame having one or more centrally located natural or imitation logs in a body of transparent plastic material; which material projects, reflects and embellishes the light originating at a central light source in the interior of the device so as to produce the illusion of an active flame or fire.

In one form of the invention, the light emanates from the light source and hits the body of the transparent plastic material at two points. In other forms either one or several concealed contact points between light from the light source and the plastic material are created. In yet another form of the invention, narrow rods made of a material having the optical property of conducting light through its length in spite of curves and of delivering this light at the surface opposite the light receiving surface with minimum loss are interspersed in the body of the transparent plastic material. The light receiving surface is positioned near the light source disposed at a concealed point and transmits the light to a visible point on the outside of the log structure, thereby providing the high light so commonly noted in natural flames.

One of the materials having the optical property which has been referred to above is the methyl methacrylate polymer or copolymer commercially known as "lucite" and "plexiglas." It should, however, be noted that the chemical nature of the material having this interesting optical property is of little importance and that it is the optical property only which is of interest. Many other materials of entirely different chemical compositions will and have served to complete satisfaction.

It should also be mentioned that the plastic material mentioned above may be molten glass, any transparent plastic, Celluloid, ethyl cellulose, vinylidene chloride polyethylene or any other transparent organic or inorganic polymer.

In general, according to the invention the plastic material is poured in liquid form over the log or logs and is permitted to slowly solidify to form irregularly shaped tips having the likeness of a flame when the material is solidified. It should, however, be noted that the flamelike appearance of the product of the invention may be greatly enhanced by coloring the surface of the plastic after solidification so as to provide an interesting and attractive illusionary pattern.

From what has been said above and from the remainder of the specification, it will readily appear that a very attractive product producing the desired effect can readily be made in accordance with the invention. However, the new product is nevertheless inexpensive and can be made with a minimum expenditure of time and effort from relatively inexpensive and readily available machinery and raw materials.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure, where similar parts are indicated by similar numerals throughout the several views shown:

In accordance with the invention, one or more logs 10 are placed adjacent to each other so as to provide a place of concealment for a light source 11 and are subjected to treatment with a viscous liquid material which will partially penetrate the spaces between adjacent logs as indicated at 12 and which will slowly solidify while dripping off the logs. By the nature of the process somewhat flamelike branches 13 will be formed by the dripping and simultaneously solidifying liquid. To make the liquid solidify into an even more flamelike shape, forming may be undertaken just before ultimate solidification. This forming usually need not be very extensive in view of the natural properties of the liquid.

After solidification a plastic rigid mass 14 will unite the logs and form a flamelike structure. Painting of its surface may be resorted to, to make it appear even more flamelike.

Figure 1:
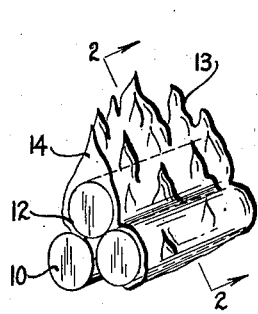
Fig. 1 is a perspective view of an imitation flame constructed in accordance with the invention.
Figure 2:
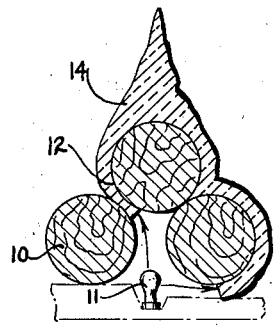
Fig. 2 is a vertical sectional view taken on line 2—2 of Fig. 1.

In one form of the invention there will be but two contact lines between the light and the plastic body. This alone may give a very satisfactory illusion as shown in Figs. 1 and 2.

Figure 4:
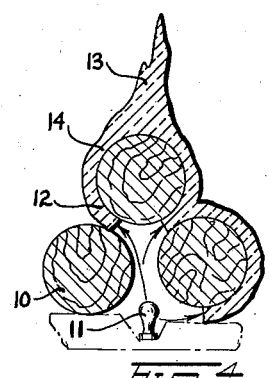
Fig. 4 is a horizontal sectional view through line 4—4 of Fig. 3.
Figure 3:
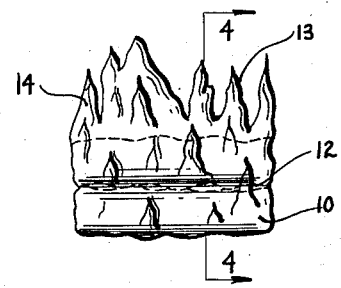
Fig. 3 is a front elevational view of an artificial flame constructed in accordance with a second form of the invention.
Figure 5:
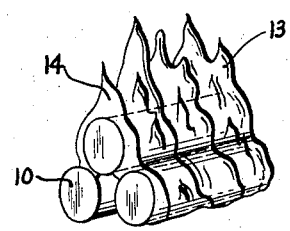
Fig. 5 is a perspective view of the product made in accordance with the modification of Figs. 3 and 4.

Natural or artificial irregularities of the log may permit light to strike at several spaced points thus heightening the illusion as shown in Figs. 3 and 4. Fig. 5 shows this more intricate form in perspective.

Figure 6:
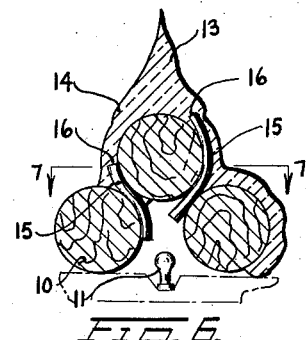
Fig. 6 is a horizontal sectional view taken in a manner similar to the manner in which Figs. 2 and 4 were taken yet illustrating a third form of the invention.
Figure 7:
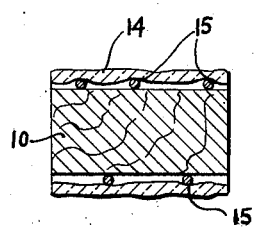
Fig. 7 is a horizontal sectional view through line 7—7 of Fig. 6.

In Fig. 6 and in Fig. 7 another modification is shown where irregularly shaped narrow rods 15 of polymethyl methacrylate or a similar material as above defined are embedded in the plastic material with upper light emitting ends 16 bordering on the plastic material. This material preferably should be of a different composition to obtain distinctly different characteristics. For example, it has been found advantageous to employ a plastic having a different refractive index and other distinguishing general optical properties. This gives a very attractive and very natural looking effect.

In other respects this form of the invention is identical to the prior form and like parts may be recognized by like reference numerals.

While we have illustrated and described the preferred embodiments of our invention, it is to be understood that we do not limit ourselves to the precise constructions herein disclosed and the right is reserved to all changes and modifications coming within the scope of the invention as defined in the appended claim.

Having thus described our invention, what we claim as new, and desire to secure by United States Letters Patent is:

As a new article of manufacture, an artificial flame and log assembly comprising a log structure, a flame-shaped covering of light transmitting plastic material thereon and a hidden light source, said flame-shaped covering having a surface facing said hidden light source and receiving radiation therefrom for transmittal into the body of said covering, said face being sub-divided into several separate sections confronting the light source at distinct places, said plastic covering having embedded therein rods of plastic material, each having a refractive index different from the refractive index of the main body of said plastic material and each being constructed of material having the light transmitting properties of polymethyl methacrylate.

PHILIP MUNAO.
CARMELO C. MUNAO.

REFERENCES CITED

The following references are of record in the file of this patent:

UNITED STATES PATENTS

| Number | Name | Date |
| --- | --- | --- |
| 1,827,941 | Gross | Oct. 20, 1931 |
| 1,842,401 | Hamblet | Jan. 26, 1932 |
| 2,169,825 | Warren | Aug. 15, 1939 |

FOREIGN PATENTS

| Number | Country | Date |
| --- | --- | --- |
| 356,777 | Great Britain | Sept. 14, 1931 |
| 592,596 | France | May 2, 1925 |